United States Patent [19]

Bourret et al.

[11] Patent Number: 4,987,777
[45] Date of Patent: Jan. 29, 1991

[54] LIQUID LEVEL SIGHT GAUGE

[75] Inventors: Michel Bourret, Drummondville; Bernard Guy, Sherbrooke, both of Canada

[73] Assignee: Bombardier Inc., Montreal, Canada

[21] Appl. No.: 400,806

[22] Filed: Aug. 30, 1989

[51] Int. Cl.[5] .............. G01F 23/02; G01F 23/00; G01F 15/04; B65D 25/54

[52] U.S. Cl. .............. 73/328; 73/323; 277/178; 116/227; 116/276; 220/663

[58] Field of Search .......... 73/323, 324, 325, 326, 73/327, 328, 329, 330, 331, 332, 334; 220/82 R, 82 A; 116/227, 276; 277/189, 207 R, 178

[56] References Cited

U.S. PATENT DOCUMENTS

| | | | |
|---|---|---|---|
| 2,718,147 | 8/1953 | Wilson | 73/328 |
| 2,847,856 | 10/1955 | Mahon | 73/325 |
| 3,540,276 | 9/1968 | Lyden | 73/328 |
| 3,886,796 | 3/1975 | Gruett | 73/328 |
| 3,968,688 | 7/1976 | Eaton et al. | 73/328 |
| 4,133,287 | 1/1979 | Downs | 116/276 |
| 4,363,240 | 12/1982 | Mizusaki | 116/227 |

FOREIGN PATENT DOCUMENTS

| | | |
|---|---|---|
| 534194 | 12/1956 | Canada . |
| 745388 | 11/1966 | Canada . |
| 853468 | 10/1970 | Canada . |
| 954324 | 9/1974 | Canada . |
| 954331 | 9/1974 | Canada . |
| 1073241 | 3/1980 | Canada . |

Primary Examiner—William A. Cuchlinski, Jr.
Assistant Examiner—Alvin Wirthlin
Attorney, Agent, or Firm—Larson and Taylor

[57] ABSTRACT

A liquid level sight gauge useful in the fuel tank of a recreational vehicle such as a snowmobile is molded in two parts and can be installed without special tools in simple cylindrical holes provided in the wall of the tank or container. The gauge has a tubular body communicating with projecting cylindrical spigots which are passed through sleeves of a resilient gasket which sleeves secure them in the holes of the container wall.

8 Claims, 2 Drawing Sheets

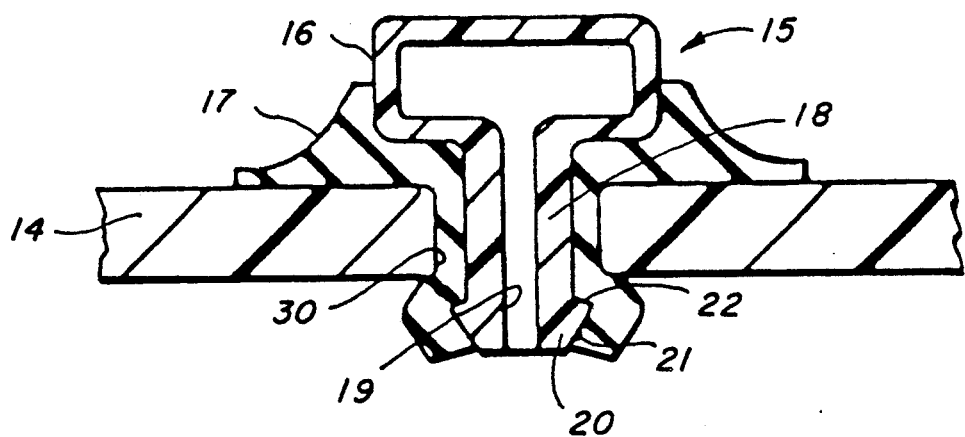
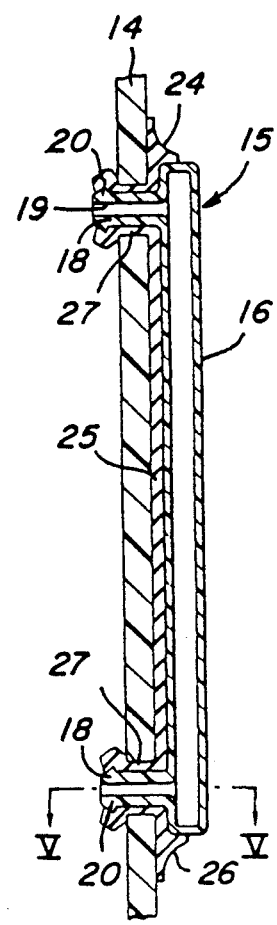
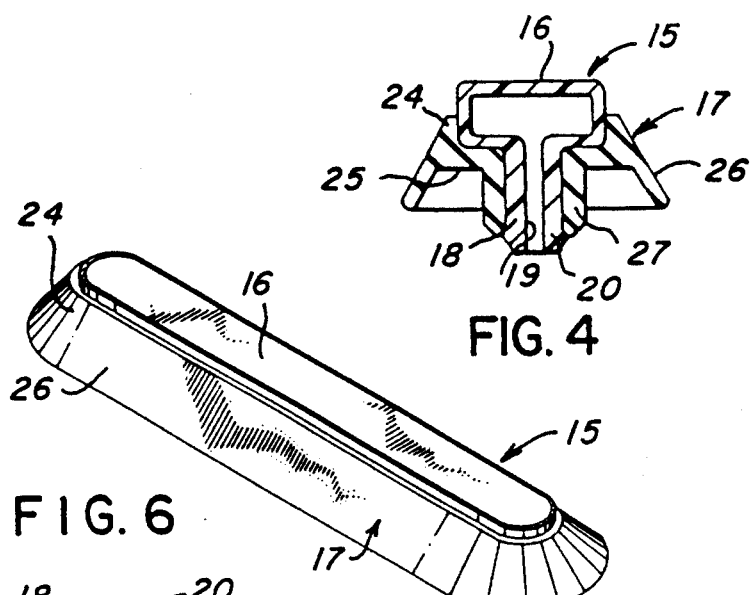
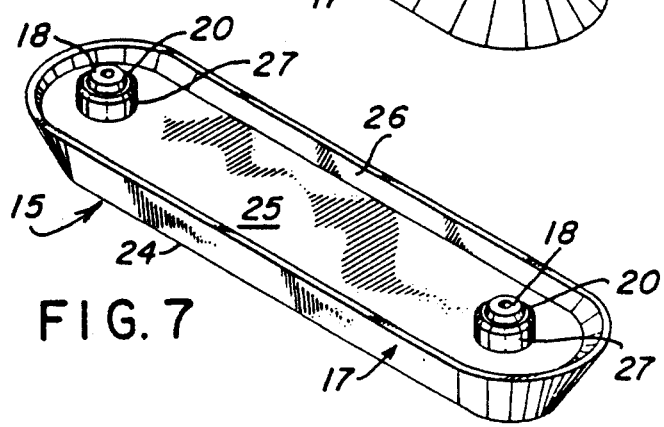

LIQUID LEVEL SIGHT GAUGE

FIELD OF THE INVENTION

This invention relates to a new or improved sight gauge for mounting in a container wall to provide a visual indication of the level of liquid within the container. The invention is particularly although not exclusively suited to the provision of a sight gauge for mounting in the wall of the fuel tank of a recreational vehicle such as a snowmobile, and will be described in such an application.

DESCRIPTION OF THE PRIOR ART

Sight gauges as such are well known, and numerous examples can be found in the prior art, see for example Canadian Patent No. 1,020,760 and U.S. Pat. Nos. 2,847,856 Mahon and 3,968,688 Eatom, et al. Such liquid level sight gauges have typically been relatively expensive devices requiring a large number of parts, and often being impossible to assemble and install without access to the inside of the container wall, as for example is the case with the gauge shown in U.S. Pat. No. 3,540,276 Lyden. As well as being expensive and difficult to install, most prior art sight gauges would be unable to retain pressure and avoid leakage under conditions of vibration and deflection of the container wall.

SUMMARY OF THE INVENTION

The present invention provides a sight gauge for mounting between two vertically spaced holes in the wall of a container to provide a visual indication of the liquid level in the container, said sight gauge comprising:

an elongate hollow tubular body that is at least partially translucent and has at each end thereof a tubular spigot in communication with the hollow interior of the body, said spigots extending generally parallel to each other and transverse to the length of the body, and each having a free end surrounded by a radially projecting rib located at a spacing from said body that corresponds to the thickness of the container wall, and a sleeve of resiliently compressible material of a length corresponding to that of the spigot and sized to closely surround said spigot, the width of said rib being less of the diameter of the hole and substantially greater than the internal diameter of the sleeve when in unstressed condition, the arrangement being such that with the sleeve positioned in the hole, the free end of the spigot can be inserted through the interior of the sleeve to bring said rib to a position wherein it is located on the opposite side of the wall from said body, such insertion being accommodated by resilient deformation of the sleeve, in the installed position said sleeve being in pressure contact with the spigot and with the surfaces defining said hole to form a liquid-tight seal therewith.

The sleeves are preferably formed integrally with a resilient rubber gasket that extends longitudinally of the body and is designed for interposition between the body and the container wall. Preferably the rib on each spigot has a small angle of taper facing away from the body and a large angle facing the body to the side to form a distinct step configuration. With this arrangement the spigot is relatively easily inserted through the sleeve positioned in the container wall, but the step configuration strongly resists retraction of the spigot.

Preferably the body is of low rectangular outline, being fabricated integrally with the spigots in a suitable plastic material such as polyethylene or nylon, and being translucent so that the liquid level can be observed through the wall of the body. The gasket is preferably of a resilient rubber material e.g., one that meets the specification A.S.T.M. 2-2000. The materials employed for the body and for the gasket must, of course, be compatible for use with hydrocarbon fuels. The gasket is of channel-shaped configuration to receive the body of the gauge, and has an angled peripheral wall to reduce the sharpness of the protrusion of the gauge body from the container wall. The ends of the gauge body are preferably rounded as are the corresponding portions of the gasket.

The invention further provides a container such as a fuel tank provided with a liquid level sight gauge as aforesaid.

BRIEF DESCRIPTION OF THE DRAWINGS

The invention will further be described by way of example, with reference to the company drawings, wherein

FIG. 3 is an enlarged sectional view taken on the line III—III of FIG. 2;

FIG. 4 is an enlarged sectional view of the sight gauge;

FIG. 5 is a greatly enlarged sectional view taken on the line V—V of FIG. 3 showing the sight gauge installed;

FIG. 6 is a top perspective view of the sight gauge; and

FIG. 7 is a bottom perspective view of the sight gauge.

DESCRIPTION OF THE PREFERRED EMBODIMENT

Figure 1:
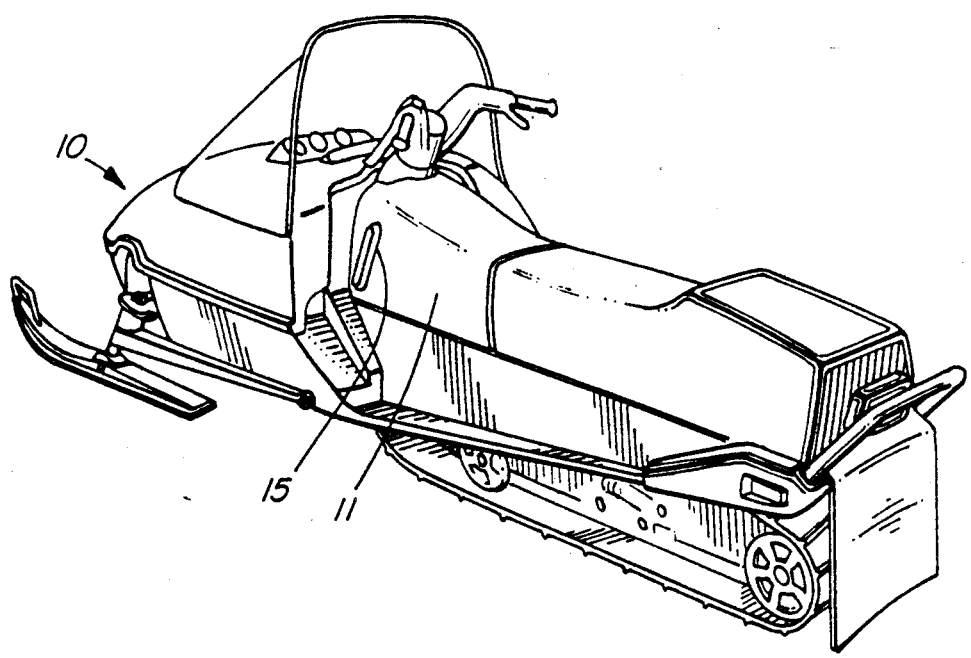
FIG. 1 is a perspective view of a snowmobile.
Figure 2:
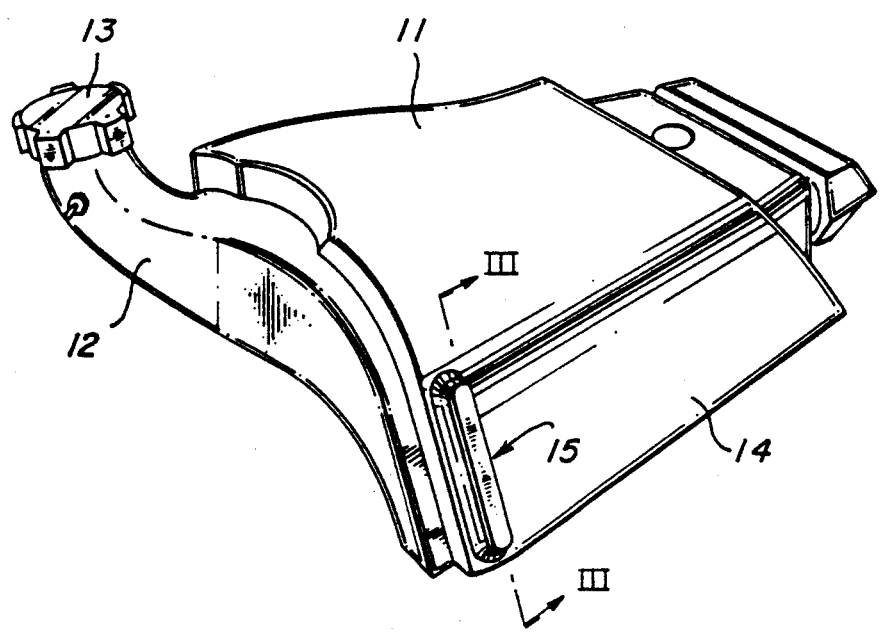
FIG. 2 is a perspective view of the snowmobile fuel tank in combination with a liquid level side gauge in accordance with the invention.

A snowmobile 10 (FIG. 1) has positioned forward of the seat a fuel tank 11 of molded plastic construction formed with a neck 12 (FIG. 2) closed by a cap 13. The tank 11 is formed by molding from a suitable plastics material such as polyethylene and is of a relatively thin-walled construction. In the forward portion of the side wall 14 of the tank a liquid level sight gauge 15 is located to provide a ready means for ascertaining the fuel level within the tank. As is more clearly seen in FIGS. 3 to 7, the gauge 15 is of essentially two-part construction. The gauge includes a translucent tubular body 16 and mating gasket 17 that is adapted to receive the body 16 and to lie flat against the wall 14.

The gauge body 15 is of elongated form and is of low rectangular cross-section as shown in FIGS. 4 and 5, the ends of the body being rounded and its top being flat as shown in FIG. 6. Adjacent to each end of the body a short cylindrical spigot 18 projects transversely at right angles thereto, the length of the spigot to being selected in accordance with the thickness of the wall 14 and of the gasket 17. A tubular passage 19 in each spigot 18 communicates with the interior of the body 16, and near the free end of the spigot there is a peripheral radially projecting rib 20. As seen in FIG. 5, the rib 20 is formed by two conically tapered surfaces. The first tapered surface 21 makes a relatively small angle with the axis of the spigot 18 whereas the second tapered surface 22 is relatively sharply angled to define an abrupt step outwards from the surface of the spigot 18 to the maximum dimension of the rib. The body 16 is fabricated by molding in a suitable plastics material such as polyethylene, and accordingly has a degree of flexibility and is resilient, especially along its length.

The gasket 17 is formed of a suitable resilient elastic material such as a natural or synthetic rubber and defines a recess in its upper side formed by a peripheral wall 24 adapted to surround the body 16 as shown in the drawings. From a flat base wall 25 of the gasket a bevelled peripheral skirt 26 projects downwardly as seen in FIG. 4, 6 and 7. At opposite ends of the base wall 25 there are downwardly projecting sleeves 27 integral with the gasket and of a length generally corresponding to but slightly shorter than the length of the spigots 18.

For installation, two holes 30 are formed in the wall 14 of the fuel tank at a spacing corresponding to that of the spigots 18. The holes are of a diameter slightly in excess of the maximum width across the rib 20, but considerably less than the combined diameter of the spigot 18 and sleeve 27. Once the holes 30 have been formed, the gasket 17 is laid against the wall 14 and the sleeves 27 inserted through the respective holes 30, this insertion being accomplished easily through deformation of the sleeves. With the gasket thus positioned, the gauge body 16 is moved into a location wherein the spigots 18 are in registered alignment with the bores of the resilient sleeves 27, the body 16 thereafter being pressed towards the wall 14 to insert the spigots 18 into and through the sleeves 27 to arrive at the position shown in FIG. 3 and 5. During this insertion movement, the material of the sleeve 27 is deflected by being spread and compressed by the rib 20 as it slides through the sleeve to reach the position shown in FIG. 5. Thus in the installed position each of the sleeves 27 is tightly squeezed between the cylindrical walls defining the hole 30 and the spigot 18. This forms an effective seal against the egress of liquid from inside the tank. The integrity of the seal is further enhanced by ensuring that the spacing between the rib 20 and underside of the base wall 25 is such that in the installed position there is a compressive action between the underside of the body 16 and the wall 14 acting on both sides of the base wall 25 of the gasket, and there is a compressive action between the rear tapered surface 22 of the rib and the interior edge of the hole 30. Thus two additional seals are formed on opposite sides of the gasket 17 interiorly and exteriorly of the wall 14.

When installed the passages 19 provide communication between the interior of the tank 11 and the interior of the body 16 of the gauge so that liquid within the tank will also be present within the body 16 and at the same level, thus providing a visual indication of the liquid level.

The combined effect of the structure as defined above is to provide a very secure seal against leakage of fuel or other liquids from the tank 11. The structure is of relatively simple construction being formed as it is essentially from only two parts, both of which can be produced relatively cheaply by molding. The sealing elements when installed are at all times under a compressive loading so as to provide a reliable seal that will not deteriorate significantly over time. The connection is secure since because of the sharp angled arrangement of the rear tapered surface 22 of the spigot, a much greater force is required to withdraw the spigot through the hole 30 then was needed to insert it, so that in practice this spigot will not be disengaged by any normally encountered operational force. From the nature of the material employed, the gauge 15 can accommodate a significant degree of flexure as can occur in service in the wall 14, and also will not be readily dislodged by vibrations and the like. The possibility of accidental dislodgement of the gauge 15 is significantly reduced by the low overall profile that it assumes when installed, as is evident from FIG. 2, in combination with the angled or bevelled surface provided around the gauge by the skirt 26 to reduce the sharpness of the projection of the gauge and thus its likelihood of its becoming snagged. Also, the skirt 26 covers any gap that might potentially occur between the base wall 25 and the curved surface of the tank wall 14 even when the latter is deflected, thus providing an excellent finished appearance.

It should be noted that the gauge 15 can be installed in the tank wall 14 without requiring the installer to have access to the interior of the wall, which is an extremely important feature in installations such as the present where there is no access to the rear of the wall 14. All that is necessary is to provide the holes 30 at the required spacing (e.g. by use of a suitable drill template) whereupon the gauge can be installed without requirement for any special purpose tools.

What we claim as our invention:

1. A sight gauge for mounting between two vertically spaced holes in the wall of a container to provide a visual indication of a liquid level in the container, said sight gauge comprising: an elongate hollow tubular body that is at least partially translucent and has at each end thereof a tubular spigot in communication with the hollow interior of the body, said spigots extending generally parallel to each other and transverse to the length of the body, and each having a free end surrounded by a radially projecting rib located at a spacing from said body that corresponds to the thickness of the container wall; and a gasket of resiliently compressible material extending longitudinally to said body for interpositioning between said body and the container wall, said gasket including two integrally formed sleeves projecting therefrom at a spacing corresponding to the spacing between said spigots, each said sleeve being of a length corresponding to that of the spigots and sized to closely surround a said spigot, the width of said rib being less than the diameter of the hole and substantially greater than the internal diameter of the sleeve when in unstressed condition, the arrangement being such that with the sleeves positioned in the holes, the free ends of the spigots can be inserted through the interior of the sleeves to bring said ribs to a position wherein they are located on the opposite side of the container wall from said body, such insertion being accommodated by resilient deformation of the sleeves, in the installed position said sleeves being in pressure contact with the spigots and with the surfaces defining said holes to form a liquid-tight seal therewith.

2. A sight gauge according to claim 1 wherein said rib on each said spigot is continuous and has on the side thereof facing away from the body a small angle of taper to facilitate insertion through the sleeve, the side thereof facing said body having a more steeply angled surface to resist withdrawal of the spigot and the sleeve from the hole once installed.

3. A sight gauge according to claim 1 wherein said gasket is formed with a recess to receive said body, said recess being bounded by a peripheral wall extending at least part way up the sides of said body, said peripheral wall extending into an angled peripheral skirt.

4. A sight gauge according to claim 3 wherein said body is of low rectangular profile and has semi-circularly rounded ends.

5. A sight gauge according to claim 4 wherein said body is molded in translucent plastic material and said gasket is molded in a natural or synthetic rubber.

6. A sight gauge for mounting between two vertically spaced holes in the wall of a container to provide a visual indication of a liquid level in the container, said sight gauge comprising: an elongate hollow tubular body that is at least partially translucent and is of low rectangular profile having rounded ends adjacent each of which is a tubular spigot in communication with the hollow interior of the body, said spigots extending generally parallel to each other and transverse to the length of the body, a gasket of resiliently compressible material extending longitudinally to said body for interpositioning between said body and the container wall, said gasket including integral means for forming a seal and an attachment between said spigots and the corresponding holes in the container wall, wherein said gasket is formed with a recess to receive said body, said recess being bounded by a peripheral wall extending at least part way up the sides of said body, said peripheral wall extending into an angled peripheral skirt.

7. A sight gauge according to claim 6 wherein the free end of each spigot is surrounded by a radially projecting rib located at a spacing from said body that corresponds to the thickness of the container wall, said integral means comprising two sleeves projecting from said gasket, said sleeves having a length and spacing corresponding to said spigots, and each being sized to closely surround a spigot, the width of the rib on each spigot being less than the diameter of the hole and substantially greater than the internal diameter of the sleeve when in unstressed condition, the arrangement being such that with the gasket positioned against the container wall with the sleeves inserted through the holes, the free ends of the spigots can be inserted through the interior of the sleeves to bring said ribs into a position where they are located on the opposite side of the container wall from said body, such insertion being accommodated by resilient deformation of the sleeves.

8. A sight gauge according to claim 6 wherein said body is moulded in translucent plastic material and said gasket is moulded in a natural or synthetic rubber.

* * * * *